United States Patent [19]

Wu et al.

[11] Patent Number: 5,285,495
[45] Date of Patent: Feb. 8, 1994

[54] PUSH-BUTTON TELEPHONE DIALING DEVICE WITH TELEPHONE HOLD FUNCTION CIRCUIT

[75] Inventors: Jui-Kuang Wu; Meng-Tsang Wu, both of Hsinchu, Taiwan

[73] Assignee: Winbond Electronic Corp., Hsinchu, Taiwan

[21] Appl. No.: 750,254

[22] Filed: Aug. 27, 1991

[51] Int. Cl.$^5$ ............................................. H04M 1/00
[52] U.S. Cl. .................................. 379/368; 379/393; 341/26
[58] Field of Search ............... 379/368, 393, 387, 355, 379/359; 341/22, 26, 30, 34

[56] References Cited

U.S. PATENT DOCUMENTS

| | | | |
|---|---|---|---|
| 4,419,543 | 12/1983 | Kelm et al. | 379/393 X |
| 4,440,981 | 4/1984 | Grantland et al. | 379/393 |
| 4,517,414 | 5/1985 | Boeckmann | 379/393 |
| 4,529,843 | 7/1985 | Boeckmann | 379/393 |
| 4,972,454 | 11/1990 | Toki et al. | 379/393 X |
| 5,003,587 | 3/1991 | Forbes | 379/393 |

Primary Examiner—James L. Dwyer
Assistant Examiner—M. Shehata
Attorney, Agent, or Firm—Harness, Dickey & Pierce

[57] ABSTRACT

A push-button telephone dialing device for a telephone set has a push-button keypad with a plurality of keys which include a hold function key, and a telephone dialing integrated circuit including a key input signal generator wired to the push-button keypad and producing an appropriate key input signal corresponding to a key pressed on the push-button keypad. The key input signal generator produces a hold function key input signal whenever the hold function key is pressed. The telephone dialing integrated circuit further includes a speech network interrupt circuit which receives the hold function key input signal from the key input signal generator. The speech network interrupt circuit is wired to and controls the operation of a speech network of the telephone set.

4 Claims, 9 Drawing Sheets

PUSH-BUTTON TELEPHONE DIALING DEVICE WITH TELEPHONE HOLD FUNCTION CIRCUIT

BACKGROUND OF THE INVENTION

1. Field of the Invention

This invention relates to a push-button telephone dialing device, more particularly to a push-button telephone dialing device which incorporates a telephone hold function circuit.

2. Description of the Related Art

As the number of telephone sets in a single household increases, so does the need to provide each telephone set with an additional telephone hold function circuit. Presently, there are two methods which can be employed so as to incorporate the telephone hold function in a telephone set. In the first method, an additional telephone hold circuit is connected to a telephone dialing integrated circuit of the telephone set. The required number of components is increased, thereby increasing the complexity and cost of the system. In the second method, the telephone hold function circuit is incorporated in the telephone dialing integrated circuit. The size of the telephone dialing integrated circuit is increased because two additional pins (the hold function input pin and the hold function output pin) are required. Moreover, the hold function input signal employed in the second method is not derived from the push-button keypad of the telephone set and thus does not undergo a debouncing process to obviate any erroneous signal. Therefore, the untimely entry and release of the telephone set from the telephone hold state caused by erroneous signals cannot be prevented.

Most telephone sets are also provided with a "hands-free" dialing circuit to permit the execution of a dialing action without lifting the telephone handset. In a conventional telephone dialing integrated circuit, which incorporates both hands-free dialing and telephone hold circuits, the operation of one function is completely independent and does not affect the operation of the other function.

To reduce the electrical power consumption of conventional telephone sets, the status of the telephone handset (off hook or on hook) is used to determine when electric power should be supplied to the telephone dialing integrated circuit. Thus, dialing and communication can be achieved only when the telephone handset is an off hook condition. No keypad input signal can be received by the telephone dialing integrated circuit when the telephone handset is in an on hook condition. From the foregoing, it can be concluded that the hands-free dialing function is incompatible and cannot be incorporated in a keypad input scan system. The keypad input scan system can be used with the telephone hold function since the telephone hold function is generally deployed when the telephone handset is in an off hook condition.

SUMMARY OF THE INVENTION

The main objective of the present invention is to provide a push-button telephone dialing device which incorporates a telephone hold function circuit, said push-button telephone dialing device being simple in construction and capable of being incorporated with a telephone dialing integrated circuit of the telephone set without increasing the size of the dialing integrated circuit (that is, no additional pins are required).

Another objective of the present invention is to provide a push-button telephone dialing device which has a debouncing circuit means to prevent the untimely entry and release of the telephone set from the telephone hold state because of the presence of erroneous signals.

Still another objective of the present invention is to provide a push-button telephone dialing device which can be operated in the hands-free dialing and telephone hold states; entry from the hands-free dialing state to the telephone hold state or vice versa can be easily accomplished by operating a hold function key on a push-button keypad.

Accordingly, the preferred embodiment of a pushbutton telephone dialing device of the present invention comprises: a push-button keypad having a plurality of keys which include a hold function key; and a telephone dialing integrated circuit means including a key input signal generating means wired to the push-button keypad and producing an appropriate key input signal corresponding to a key pressed on the push-button keypad. The key input signal generating means produces a hold function key input signal whenever the hold function key is pressed. The key input signal generating means further includes a speech network interrupting means wired to the speech network and receiving the hold function key input signal from the key input signal generating means to control operation of the speech network.

The key input signal generating means utilizes a keypad scan input system and includes a debouncing circuit means to generate a verified proper key input signal when only one of the keys of the push-button keypad is pressed for a duration at least equal to a predetermined debouncing period, and a keypad decoding circuit means to generate the appropriate key input signal corresponding to a pressed one of the keys of the push-button keypad.

The push-button telephone dialing device further comprises a music generating circuit means wired to the speech network and to the speech network interrupting means. The music generating circuit means provides a musical signal output to the speech network when the hold function key is operated to enter a telephone hold state.

Another aspect of the present invention is that the telephone set includes a hands-free dialing circuit means having a hands-free dialing key which is operated to enter or to release the telephone set from a hands-free dialing state. The speech network interrupting means includes a change over circuit means to change the telephone state from the hands-free dialing state to the telephone hold state or vice versa by simply operating the hold function key.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
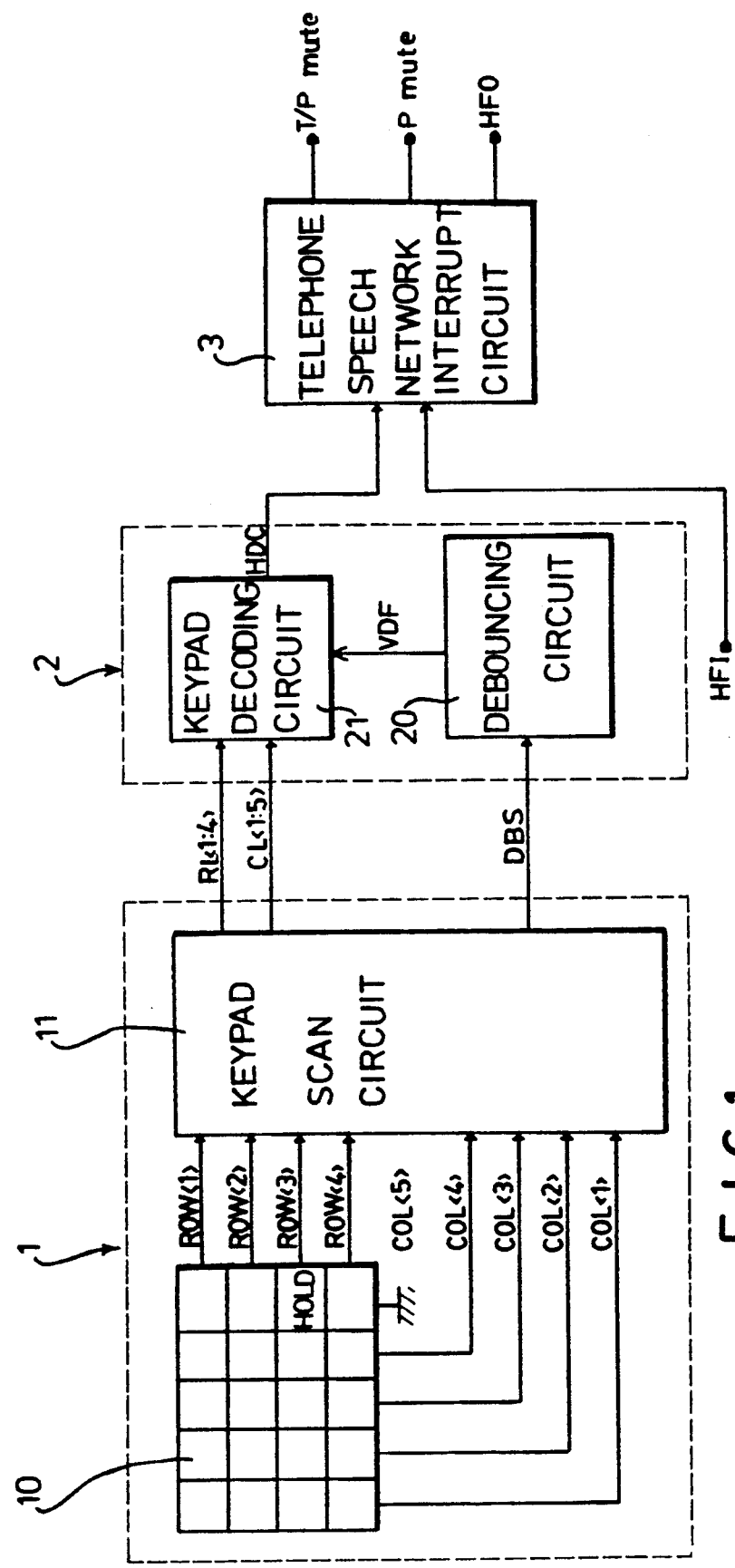
FIG. 1 is a schematic block diagram of the preferred embodiment of a push-button telephone dialing device with telephone hold function circuit according to the present invention.

Referring to FIG. 1, the preferred embodiment of a push-button telephone dialing device with telephone hold function circuit according to the present invention is shown to comprise a keypad means 1, a keypad debouncing and decoding means 2 and a telephone speech network interrupt circuit 3.

The keypad means 1 includes a push-button keypad input 10 and a keypad scan circuit 11. The keypad input 10 is a 4×5 keypad (4 rows and 5 columns of push-button keys). The keypad input 10 has four row status lines ROW <1-4>, each corresponding to one of the rows of the keypad input 10, and five column status lines COL <1-5>, each corresponding to one of the columns of the keypad input 10. The row status lines ROW <1-4> and the column status lines COL <1-4> serve as inputs to the keypad scan circuit 11. The column status line COL <5> of the keypad input 10 is grounded.

Figure 2:
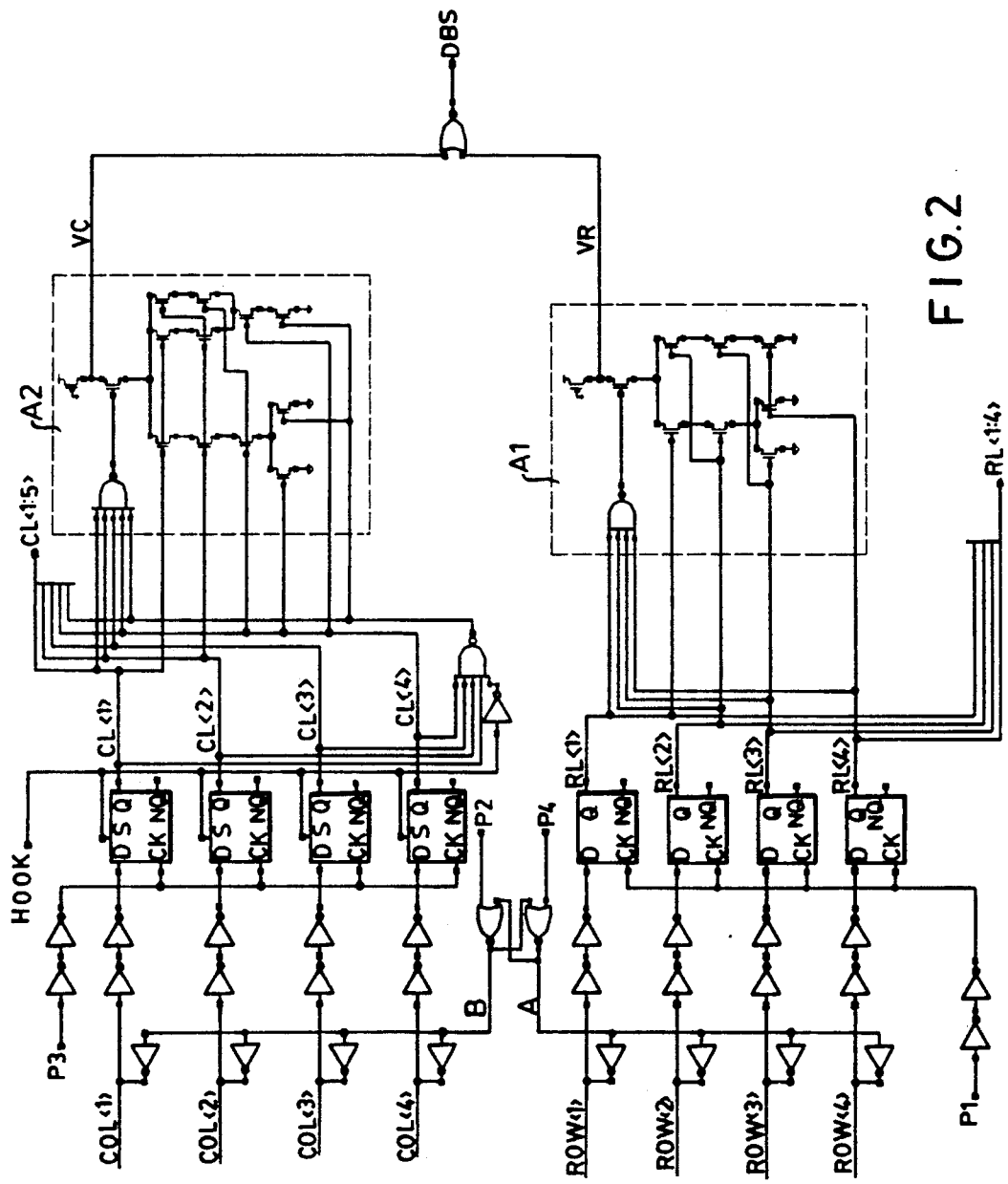
FIG. 2 is a schematic electrical circuit diagram of a keypad scan circuit of the preferred embodiment.
Figure 3:
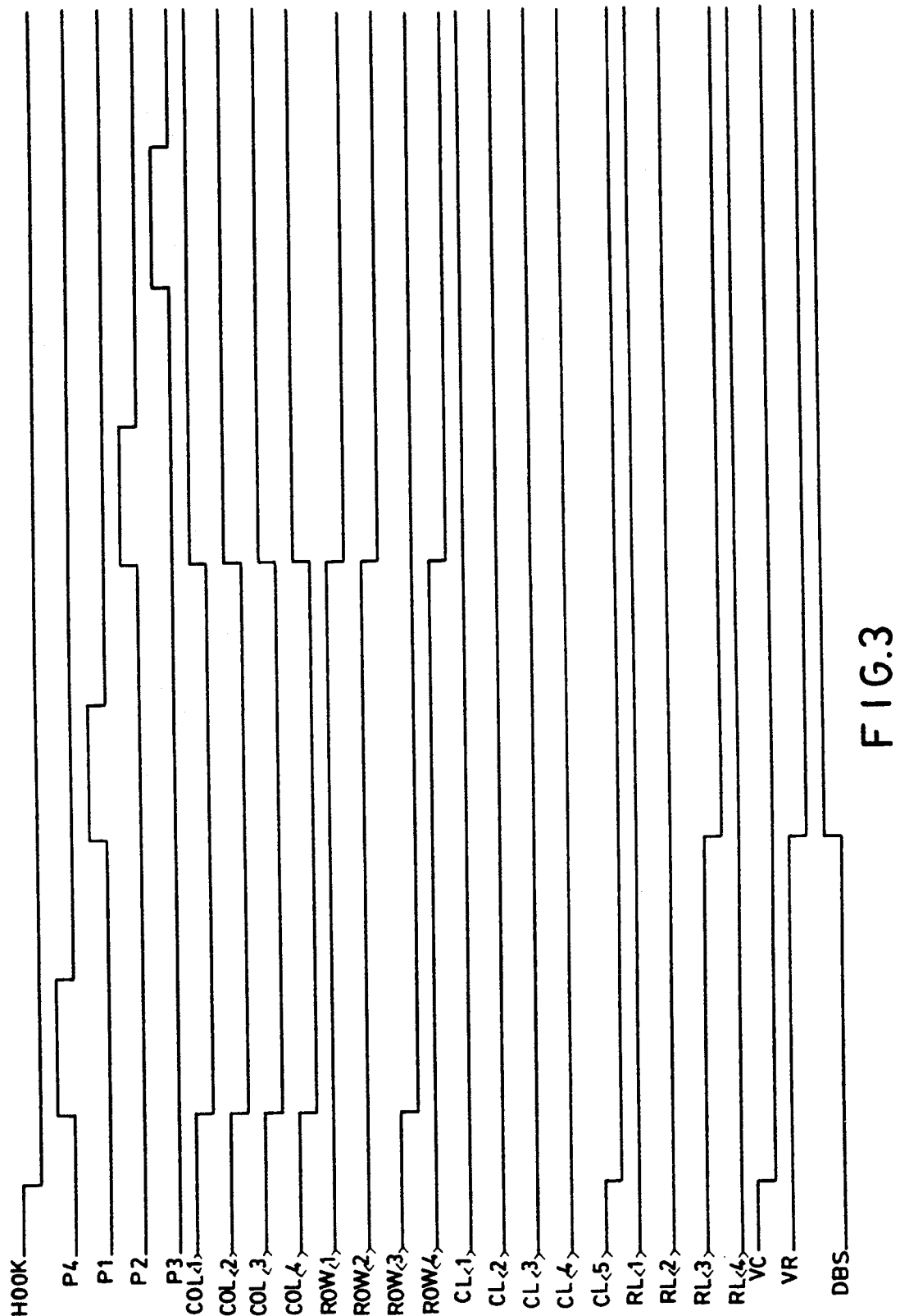
FIG. 3 is a timing diagram to illustrate the operation of the keypad scan circuit shown in FIG. 2.

Referring to the schematic electrical circuit diagram of the keypad scan circuit 11 as shown in FIG. 2, and to the timing diagram thereof as shown in FIG. 3, when the telephone handset is in an on hook condition, the HOOK signal and the column scan signals CL <1-5> are high logic signals. When the telephone handset is lifted (off hook condition), the telephone dialing integrated circuit (see FIG. 9) of the telephone set is in an initial waiting state. The HOOK signal and the column scan signal CL <5> change from the high logic signal to a low logic signal. Operation of the keypad scan circuit 11 begins when one of the keys of the keypad input 10 is pressed.

During the duration of a clock pulse signal (P4), node (A) has a low logic signal, node (B) has a high logic signal, the row status lines ROW <1-4> are pulled to a high logic signal, while the column status lines COL <1-4> are pulled to a low logic signal. When the HOLD function key is pressed, the row status line ROW <3> contacts the column status line COL <5>, thereby grounding the former. The row status line ROW <3> therefore has a low logic signal. During the duration of a clock pulse signal (P1), which clock pulse signal (P1) succeeds the clock pulse signal (P4), the respective logic signal of the row status lines ROW <1-4> are reflected as the row scan signals RL <1-4>. Therefore, the row scan signal RL <3> is a low logic signal, while the row scan signals, RL <1>, RL <2> and RL <4>, are high logic signals. The row scan signals RL <1-4> are received by a row detector circuit (A1) to check if only one of the keys of the keypad input 10 was pressed. If only one key was pressed, the (VR) signal output of the row detector circuit (A1) is a low logic signal. Otherwise, when no key was pressed or when two or more keys were simultaneously pressed, the (VR) signal output remains as a high logic signal.

During the duration of a clock pulse signal (P2) that succeeds the clock pulse signal (P1), node (B) has a low logic signal, while node (A) has a high logic signal. The row status lines RW <1-4> are pulled to a low logic signal, while the column status lines COL <1-4> revert to the high logic signal.

A clock pulse signal (P3) succeeds the clock pulse signal (P2). During the duration of the clock pulse signal (P3), the column scan signals CL <1-4> are high logic signals and serve as inputs to a NAND logic gate. The column scan signal CL <5> is derived from the output of the NAND logic gate and is therefore a low logic signal. This indicates that a key connected to the column status line COL <5> was pressed. The above method of grounding one of the column status lines reduces the required number of pin inputs to the telephone dialing integrated circuit while still permitting accurate decoding of a pressed key.

The column scan signals CL <1-5> are received by a column detector circuit (A2) to countercheck if only one of the keys of the keypad input 10 was pressed. If only one key was pressed, the (VC) signal output of the column detector circuit (A2) is a low logic signal. Otherwise, when no key was pressed or when two or more keys were simultaneously pressed, the (VC) signal output remains as a high logic signal.

A single pressed key condition is confirmed when both the (VR) and (VC) signal outputs are low logic signals. At this stage, the (DBS) signal output of the keypad scan circuit 11 is a high logic signal and actuates a debouncing circuit 20 of the keypad debouncing and decoding means 2.

To summarize, when the telephone handset is lifted and the HOLD function key of the keypad input 10 is pressed, the column scan signals CL <1-4> are high logic signals, while the column scan signal CL <5> is a low logic signal. The (VC) signal output is thus a low logic signal. The row scan signal RL <3> is a low logic signal, while the row scan signals, RL <1>, RL <2> and RL <4>, are high logic signals. The (VR) signal output is thus a low logic signal. Since both the (VC) and (VR) signal outputs are low logic signals, the (DBS) signal output is a high logic signal and actuates the debouncing circuit 20.

Figure 4:
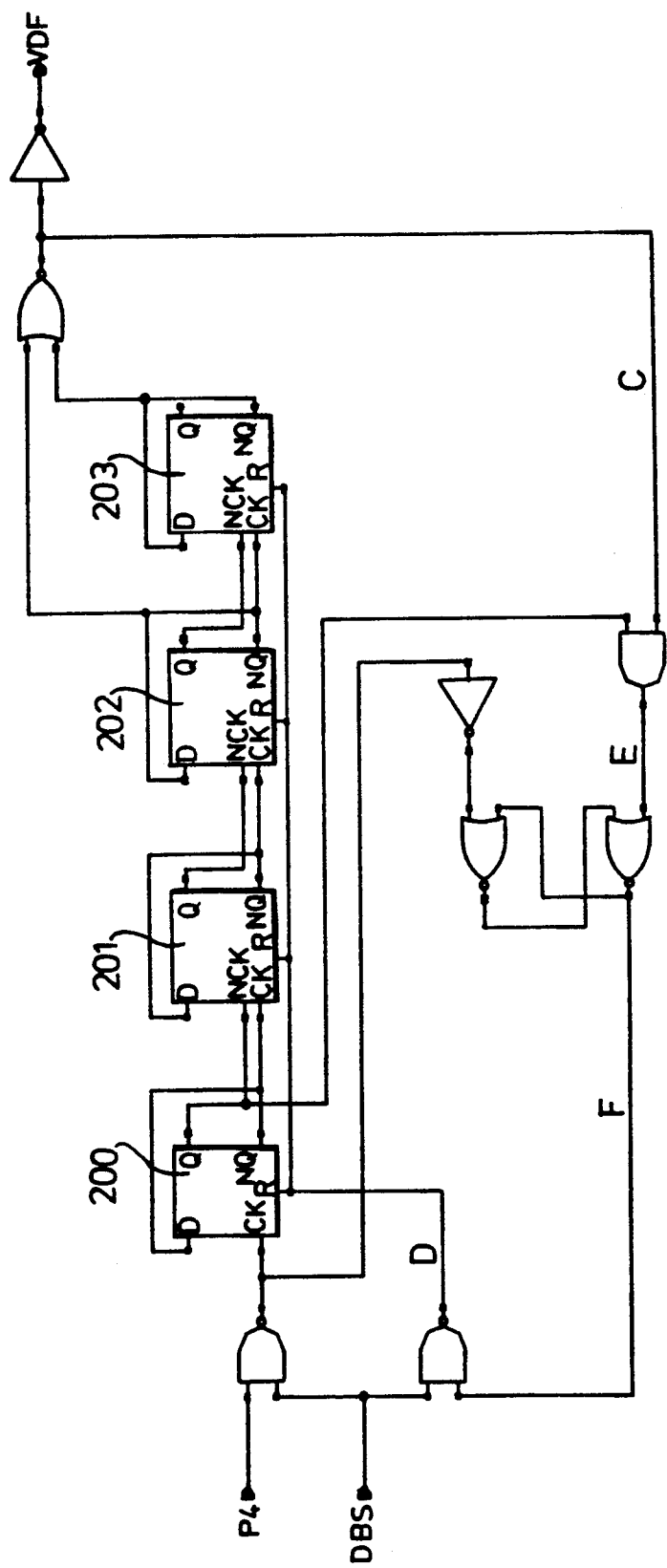
FIG. 4, is a schematic electrical circuit diagram of a debouncing circuit of the preferred embodiment.
Figure 5:
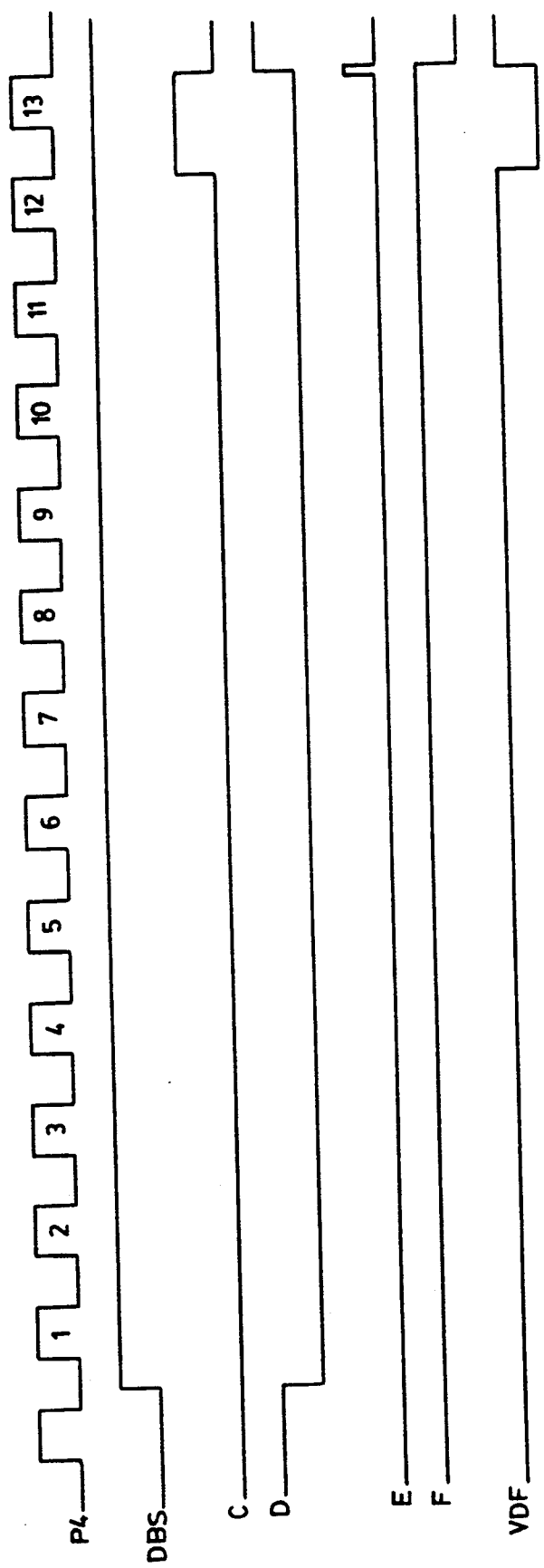
FIG. 5 is a timing diagram to illustrate the operation of the debouncing circuit shown in FIG. 4.

FIG. 4 is a schematic electrical circuit diagram of a preferred embodiment of the debouncing circuit 20. The debouncing circuit 20 may be modified so as to obtain an appropriate debouncing period. The resulting timing diagram of the debouncing circuit 20 is shown in FIG. 5. The debouncing circuit 20 receives the (DBS) signal output from the keypad scan circuit 11. When none of the keys of the keypad input 10 have been properly pressed, the (DBS) signal output is a low logic signal, node (D) has a high logic signal, thereby resetting the respective (Q) output of four counters, 200-203, to the initial zero state. Counter 200 is preferably an LDD4 type flip-flop, while counters 201-203 are preferably LDD3 type flip-flops. Since node (D) has a high logic signal, the respective (NQ) output of the counters 200-203 are at a high logic signal, and node (C) has a low logic signal. The (VDF) signal output of the debouncing circuit 20 is a high logic signal, indicating that none of the keys of the keypad input 10 have been properly pressed. When one of the keys of the keypad input 10 is pressed, the (DBS) signal output is a high logic signal. At this stage, the counter 200 receives the clock pulse signal (P4) to initiate the counting action of the counters 200-203. After counting twelve (P4) clock pulses, the respective (Q) output of the counters 202 and 203 are high logic signals, the respective (NQ) output of the same are low logic signals, node (C) has a high logic signal, and the (VDF) signal output is a low logic signal, indicating that one of the keys of the keypad input 10 was pressed for a time period equal to or exceeding the debouncing period. During the thirteenth (P4) clock pulse, node (C) remains at a high logic signal, the (Q) output of counter 200 is a high logic signal, node (E) has a high logic signal, node (F) has a low logic signal, and node (D) has a high logic signal, thereby resetting the respective (Q) output of the counters 200-203 to the initial zero state. Node (C) immediately returns to the low logic signal, and the (VDF) signal output reverts to the high logic signal. This illustrates the debouncing operation of the debouncing circuit 20.

Note that if a key was pressed for a time period less than twelve (P4) clock pulses, the (VDF) signal output remains a high logic signal, indicating that no key was properly pressed. Extraneous signals and other signals caused by improperly pressing the keys of the keypad input 10 are thus eliminated through the use of the debouncing circuit 20.

Referring once more to FIG. 5, note that the (VDF) signal output is a negative pulse signal that is generated during the duration of the twelfth and thirteenth (P4) clock pulse. The (VDF) signal output is received by a keypad decoding circuit 21 of the keypad debouncing and decoding means 2 to activate the same when a key of the keypad input 10 is pressed in the correct manner.

Figure 6:
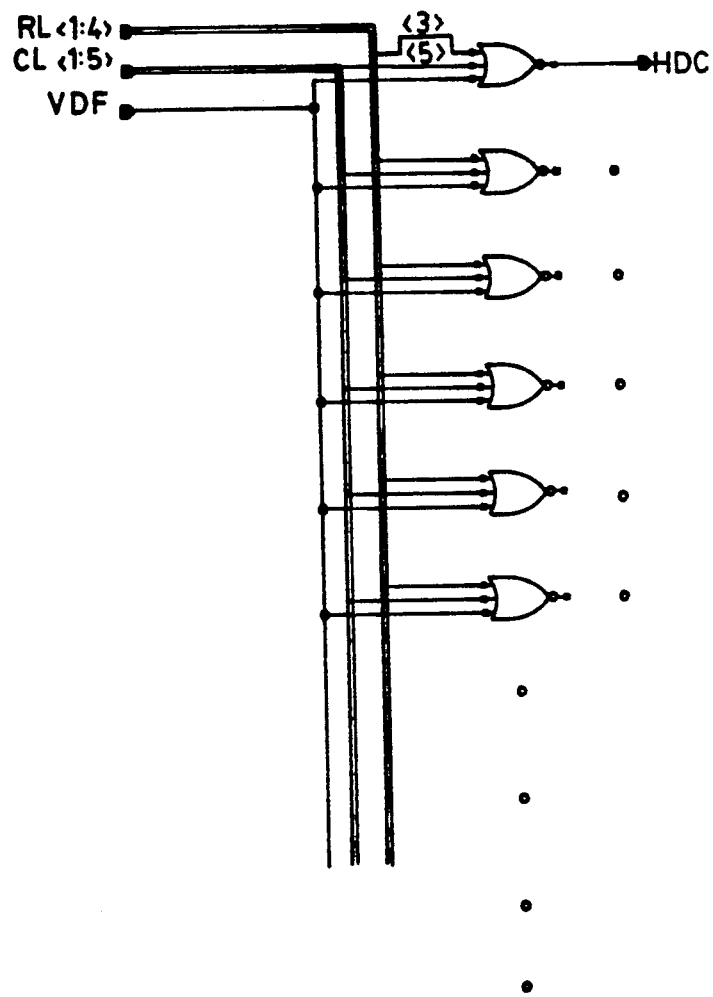
FIG. 6 is a schematic electrical circuit diagram of a keypad decoding circuit of the preferred embodiment.

Referring to FIGS. 1 and 6, the keypad decoding circuit 21 receives the row scan signals RL <1-4> and the column scan signals CL <1-5> from the keypad scan circuit Il and the (VDF) signal output of the debouncing circuit 20. The decoding process is as follows: The keypad decoding circuit 21 comprises a plurality of three-input NOR logic gates, each NOR logic gate corresponding to one of the keys of the keypad input 10. The inputs to each NOR logic gate are the (VDF) signal output, one of the row scan signals RL <1-4>, and one of the column scan signals CL <1-5>. For example, the hold function key input signal (HDC) is generated by a NOR logic gate having the (VDF) signal output, the row scan signal RL <3> and the column scan signal CL <5> as its inputs. When the HOLD function key is pressed, the row scan signal RL <3> and the column scan signal CL <5> are low logic signals. The (VDF) signal output is similarly a low logic signal after a debouncing period to ensure that the HOLD function key was pressed in the correct manner. At this stage, the hold function key input signal (HDC) is at a high logic signal and is used to actuate the telephone speech network interrupt circuit 3.

Figure 7:
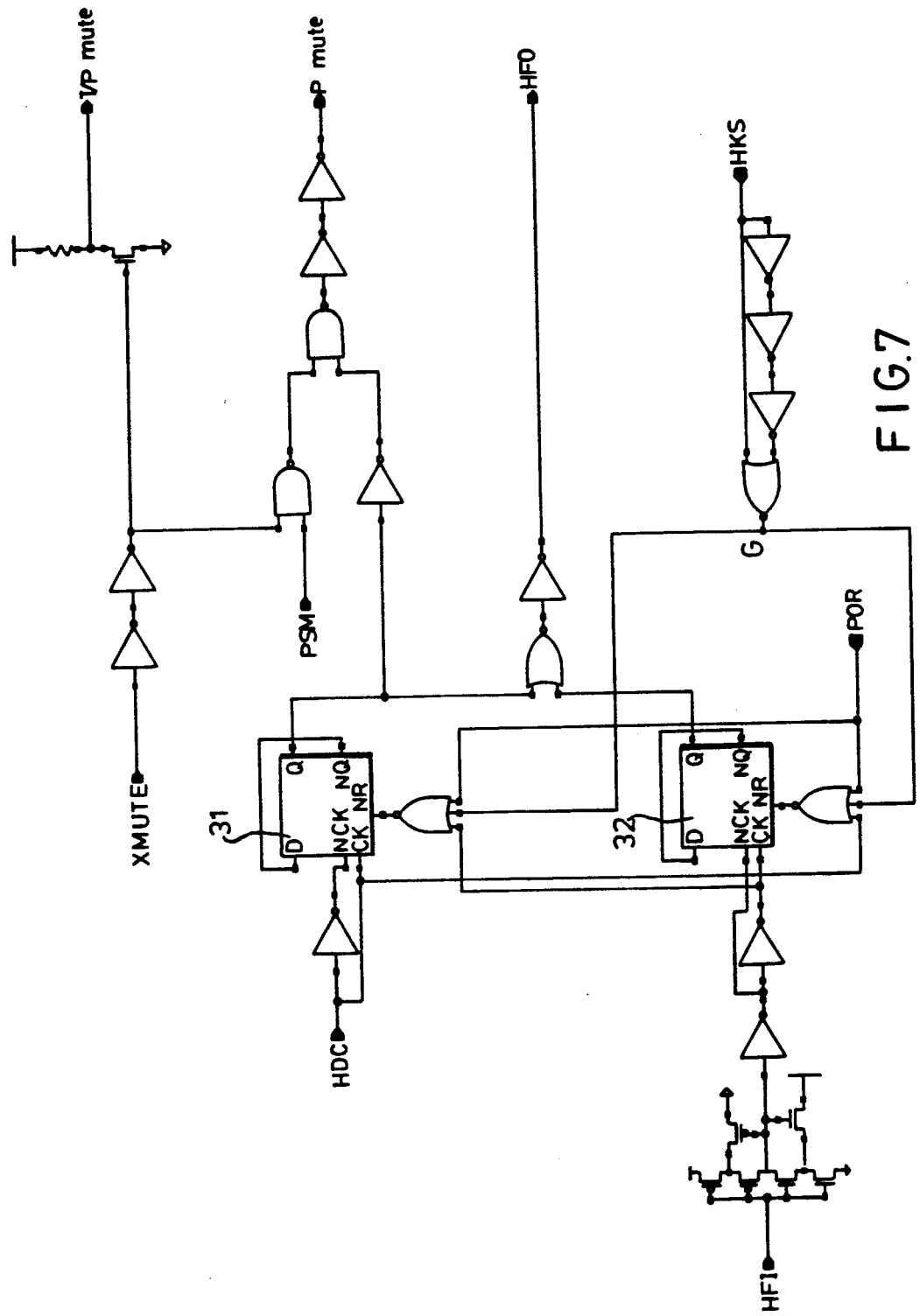
FIG. 7 is a schematic electrical circuit diagram of a telephone speech network interrupt circuit of the preferred embodiment.

Referring to FIGS. 1 and 7, the input signals to the telephone speech network interrupt circuit 3 are the hold function key input signal (HDC), the hands-free function input signal (HFI), the telephone handset status signal (HKS), the power supply reset signal (POR), the dial tone interrupt signal (X mute), and the dialing status signal (PSM). The output signals of the telephone speech network interrupt circuit 3 are the hands-free function output signal (HFO), the tone and pulse dialing mute signal (T/P mute) and the pulse mute signal (P mute). When the telephone dialing integrated circuit is connected to a power source, a positive pulse signal corresponding to the power supply reset signal (POR) is generated to reset the (Q) outputs of flip-flops, 31 and 32, to the initial low logic signal. When the telephone handset is lifted, a positive pulse signal is generated at node (G) to similarly reset the (Q) outputs of the flip-flops, 31 and 32. When the (Q) outputs of the flip-flops, 31 and 32, are reset, the tone and pulse dialing mute signal (T/P mute) is a high logic signal, while the pulse mute signal (P mute) and the hands-free function output signal (HFO) are low logic signals. When the HOLD function key of the keypad input 10 is pressed in the correct manner, a pulse signal corresponding to the hold function key input signal (HDC) is detected at the clock input of flip-flop 31, causing the (Q) output thereof to change from the low logic signal to the high logic signal. At the same time, the hold function key input signal (HDC) resets the (Q) output of the flip-flop 32, thereby resetting the hands-free function of the telephone set. At this time, the hands-free function output signal (HFO) and the pulse mute signal (P mute) change from the low logic signal to the high logic signal, while the tone and pulse dialing mute signal (T/P mute) is maintained as a high logic signal. The telephone set is now in a hold function state.

When the HOLD function key is pressed for a second time, another hold function key input signal (HDC) is generated, and the (Q) output of the flip-flop 31 changes from the high logic signal to the low logic signal. The logic signal of the tone and pulse dialing mute signal (T/P mute) remains unchanged, while the pulse mute signal (P mute) and the hands-free function output signal (HFO) change from the high logic signal to the low logic signal. The tone and pulse dialing mute signal (T/P mute) is maintained as a high logic signal unless a dialing action is performed. When a dialing action is performed, the dial tone interrupt signal (X mute) is at a high logic signal, thereby causing the tone and pulse dialing mute signal (T/P mute) to change to the low logic signal and interrupt the operation of a telephone speech network of the telephone set. The pulse mute signal (P mute) is a high logic signal during a pulse dialing action and is maintained as a low logic signal during a tone dialing action. When dialing has been accomplished, the tone and pulse dialing mute signal (T/P mute) reverts to the high logic signal. The pulse mute signal (P mute) undergoes a transition from the low logic signal to the high logic signal when the dialing status signal (PSM) is a high logic signal or when the telephone set is in a hold function state.

When the telephone set is in a hold function state, the tone and pulse dialing mute signal (T/P mute) and the pulse mute signal (P mute) are high logic signals. The succeeding paragraphs will describe in greater detail as to how the tone and pulse dialing mute signal (T/P mute) and the pulse mute signal (P mute) affect the operation of the telephone speech network. Providing the telephone dialing integrated circuit with a hold function output pin is unnecessary since the speech network can be connected to the pulse mute signal (P mute) output pin, thereby further reducing the required number of pins of the telephone dialing integrated circuit incorporating the preferred embodiment. The telephone hold function can thus be easily added to the telephone set. This illustrates the conveniences offered by the present invention.

Referring once more to FIG. 7, the hands-free function input signal (HFI) serves as an input to a Schmitt trigger circuit which is in turn connected to the clock input of the flip-flop 32. When a hands-free function input signal (HFI) is generated, the (Q) output of flip-flop 32 is a high logic signal, and the (Q) output of flip-flop 31 is reset to the low logic signal, thereby resetting the telephone hold function of the telephone set. At this stage, the hands-free function output signal (HFO) changes to the high logic signal, and the logic signals of the tone and pulse dialing mute signal (T/P mute) and the pulse mute signal (P mute) remain unchanged. The telephone set is presently in the hands-free dialing state, thereby permitting the execution of a dialing action without lifting the telephone handset. When a second hands-free function input signal (HFI) is received, the (Q) output of the flip-flop 32 returns to the low logic signal, and the hands-free function output signal (HFO) reverts to the low logic signal. The logic signals of the tone and pulse dialing mute signal (T/P mute) and the pulse mute signal (P mute) remain unaffected. The telephone set is now removed from the hands-free dialing state.

From the preceding paragraphs, the preferred embodiment of a push-button telephone dialing device with telephone hold function circuit according to the present invention generates a tone and pulse dialing mute signal (T/P mute) and a pulse mute signal (P mute) to control the operation of the telephone speech network so as to achieve the telephone hold function. A hands-free function output signal (HFO) is also generated so as to achieve the hands-free dialing function. Entry into the hands-free dialing function causes a release from the telephone hold function, and vice versa. The operation of the hands-free dialing function is therefore not completely independent of the telephone hold function, as is taught by conventional telephone dialing integrated circuits which incorporate both functions. This illustrates an added feature of the present invention.

Figure 8:
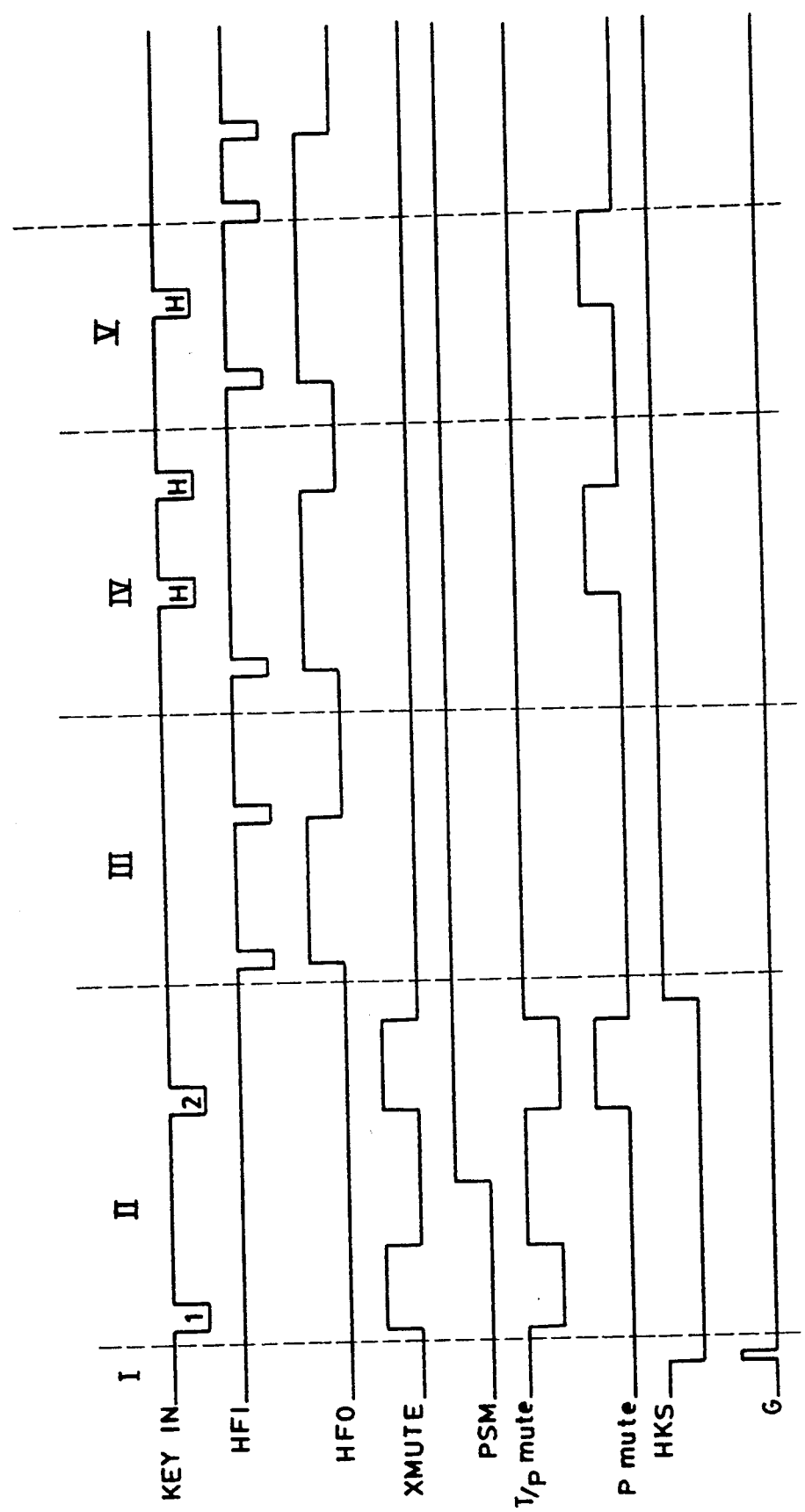
FIG. 8 is a timing diagram to illustrate the operation of the telephone speech network interrupt circuit shown in FIG. 7.
Figure 9:
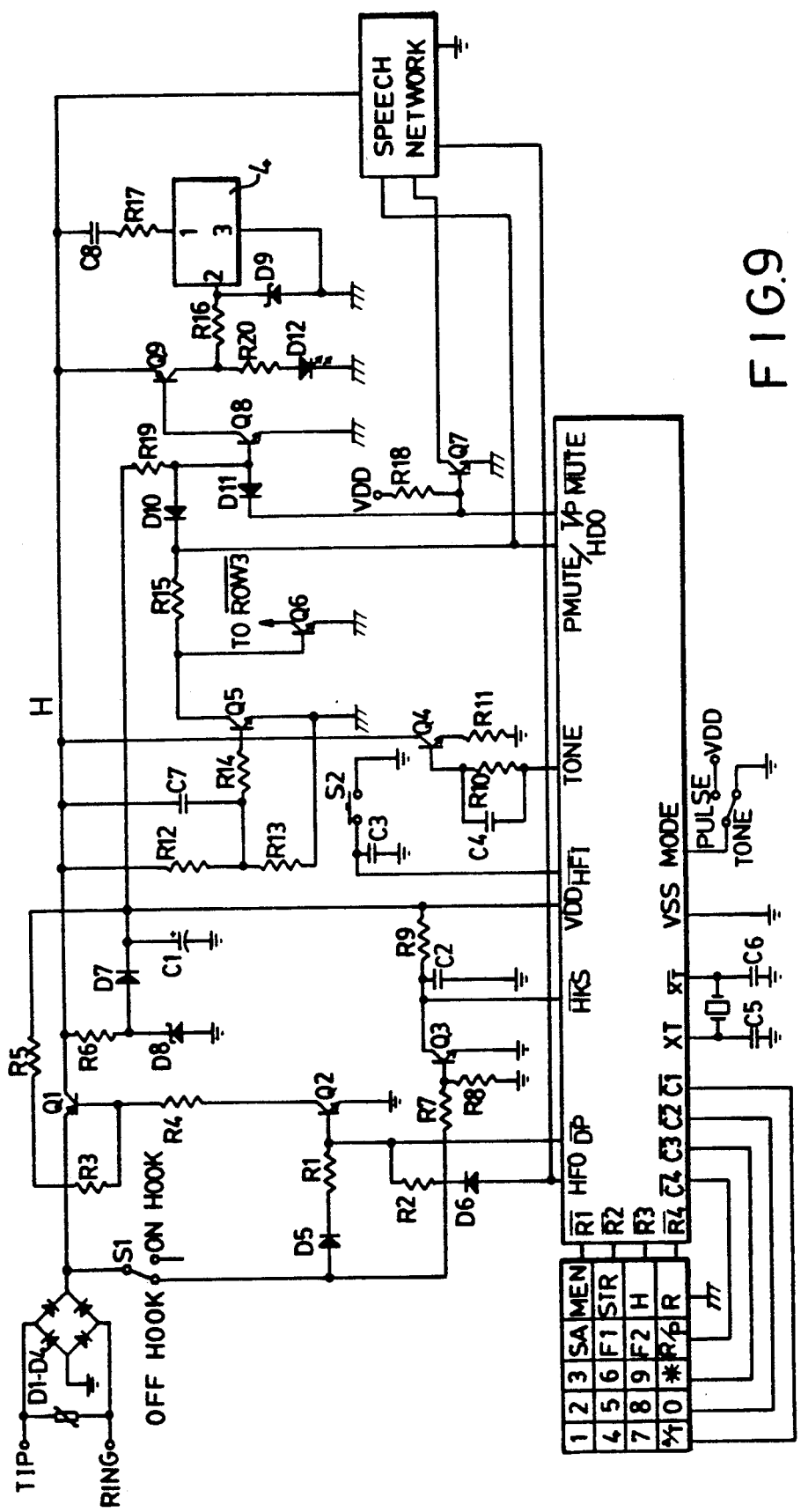
FIG. 9 is a schematic electrical circuit diagram of the preferred embodiment and its intended environment.

A timing diagram illustrating the operation of the preferred embodiment during a dialing action, a hands-free dialing state, or a telephone hold state is shown in FIG. 8. FIG. 9 is a schematic electrical circuit diagram of the preferred embodiment and its intended environment. A detailed discussion of the features, operation and the intended environment of the preferred embodiment follows:

1. The first portion (I) of the timing diagram shown in FIG. 8 shows the preferred embodiment when in an initial operating state. Referring to FIGS. 7 and 8, when the telephone handset is lifted, the telephone handset status signal (HKS) is a low logic signal, thereby generating a pulse signal at node (G). Initially, the dialing status signal (PSM) is a low logic signal, indicating that tone dialing is selected. Referring to FIG. 9, when the telephone handset is lifted, a switch (S1) is moved to the off hook position to connect a power supply source to the base terminal of a transistor (Q3) via a resistor (R7). The transistor (Q3) is operated in the saturation region, thereby pulling the potential at the (HKS) input pin of the telephone dialing integrated circuit to a low logic signal. This indicates that the telephone dialing integrated circuit is in a dial waiting state.

The power supply source is similarly connected to the base terminal of a transistor (Q2) via a diode (D5) and a resistor (R1). As the transistor (Q2) begins to conduct, the collector voltage thereof is brought to near zero potential. A transistor (Q1) similarly conducts because of the application of a bias voltage thereto via resistors, (R3) and (R4).

The voltage output (roughly 48 volts) of the power supply source is maintained at 5.1 volts by the transistor (Q1), a resistor (R6), and a zener diode (D8). The regulated 5.1 volts output serves as a power supply input to the telephone dialing integrated circuit. When the telephone set is in a dial waiting state, electric power is supplied to the telephone speech network. The tone and pulse dialing mute signal (T/P mute) is a high logic signal and is applied to the base of a transistor (Q7), thereby causing the conduction thereof to pull its collector voltage to near zero potential. This permits use of the telephone speech network. The pulse mute signal (P mute) is a low logic signal (P mute is at a low logic signal when a tone dialing mode is selected) and pulls the base voltage of a transistor (Q8) to near zero potential. The transistor (Q8) does not conduct, and a transistor (Q9) connected thereto is not driven into operation. A music generating integrated circuit 4 of the preferred embodiment does not operate because no electrical signal is received at a pin 2 thereof. Since the pulse mute (P mute) signal is a low logic signal, a transistor (Q6) is in a high impedance state because little or no bias voltage is applied to the base terminal thereof. This describes the dial waiting conditions of the telephone set after lifting the telephone handset.

2. Referring to FIGS. 7 and 9, and to the second portion (II) of the timing diagram shown in FIG. 8, when the "1" key of the keypad input 10 is pressed, the dial tone interrupt signal (X mute) is a high logic signal and the tone and pulse dialing mute signal (T/P mute) is a low logic signal. The logic signals of the hands-free function output signal (HFO) and the pulse mute signal (P mute) remain unchanged (the telephone set is initially in a tone dialing mode). Since the tone and pulse dialing mute signal (T/P mute) is a low logic signal, the base terminal of the transistor (Q7) similarly has a low logic signal. The transistor (Q7) is not in operation, thereby interrupting the operation of the telephone speech network. The dialing tones assigned to the "1" key is generated at the TONE output pin of the telephone dialing integrated circuit and is amplified by an amplifier circuit which comprises a transistor (Q4), resistors (R10) and (R11), and a capacitor (C4). The output of the amplifier circuit can be obtained from the collector terminal of the transistor (Q4). After dialing is accomplished, the dial tone interrupt signal (X mute) reverts to the low logic signal, the tone and pulse dialing mute signal (T/P mute) returns to the high logic signal, and the telephone set is restored to the dial waiting state.

When the telephone set is in a pulse dialing mode, the dialing status signal (PSM) is a high logic signal. Once the "2" key of the keypad input 10 is pressed, pulse dialing is initiated, and the dial tone interrupt signal (X mute) changes to the high logic signal. The logic signal of the hands-free function output signal (HFO) remains unchanged, the tone and pulse dialing mute signal (T/P mute) changes to the low logic signal, while the pulse mute signal (P mute) changes to the high logic signal. Referring to FIG. 9, when the tone and pulse dialing mute signal (T/P mute) changes to the low logic signal, the operation of the telephone speech network is interrupted, the dialing pulses assigned to the "2" key is generated at the DP output pin of the dialing integrated circuit and is used to actuate the switching transistor (Q2). After dialing has been accomplished, the dial tone interrupt signal (X mute) is restored to the low logic signal, the pulse mute signal (P mute) changes to the low logic signal, the tone and pulse dialing mute signal (T/P mute) returns to the high logic signal, and the telephone set is restored to the dial waiting state. When the telephone handset is replaced on the telephone cradle, the switch (S1) is moved to the on hook position, the transistor (Q2) ceases to conduct, and the telephone handset status signal (HKS) returns to the high logic signal.

3. Referring once more to FIGS. 7 and 9, and to the third portion (III) of the timing diagram shown in FIG. 8, when the telephone handset is replaced on the cradle, and when a pulse signal corresponding to the hands-free function input signal (HFI) is generated, the logic signals of the tone and pulse dialing mute signal (T/P mute) and the pulse mute signal (P mute) remain unchanged, while the hands-free function output signal (HFO) changes from the low logic signal to the high logic signal, indicating that the telephone set is currently in a hands-free dialing state. The switch (S1) should be at the on hook position and does not connect the power supply source to the telephone dialing integrated circuit. When a push-button switch (S2) is pressed, a pulse signal corresponding to the hands-free function input signal (HFI) is generated, and the hands-free function output signal (HFO) changes from the low logic signal to the high logic signal. The hands-free function output signal (HFO) is fed to the base terminal of the transistor (Q2) via a diode (D6) and a resistor (R2), thereby causing the transistors, (Q1) and (Q2), to conduct. Electric power at the collector terminal (node H) of the transistor (Q1) is supplied to the telephone dialing integrated circuit via the resistor (R6) and a diode (D7). The telephone set is simultaneously in the dial waiting state and in the hands-free dialing state. Upon generation of another hands-free function input signal (HFI), the hands-free function output signal (HFO) changes from the high logic signal to the low logic signal, and the telephone set is released from the hands-free dialing state. When the hands-free function output signal (HFO) changes to the low logic signal, the transistors, (Q1) and (Q2), cease to operate, and the telephone set is restored to the initial operating state.

4. Referring to the FIGS. 7 and 8, and to the fourth portion (IV) of the timing diagram shown in FIG. 8, when a pulse signal corresponding to the hands-free function input signal (HFI) is generated the telephone set enters the hands-free dialing state and the hands-free function output signal (HFO) changes from the low logic signal to the high logic signal. When the HOLD function key is pressed, the logic signal of the tone and pulse dialing mute signal (T/P mute) remains unchanged. However, the pulse mute signal (P mute) changes from the low logic signal to the high logic signal. This indicates that the telephone set is currently in the telephone hold state. When the telephone set is in the telephone hold state [the tone and pulse dialing mute signal (T/P mute) and the pulse mute signal (P mute) are both high logic signals], the diodes (D10) and (D11) are in a reverse bias condition. The potential at the base terminal of the transistor (Q8) rises to cause the operation of the transistors (Q8) and (Q9) in the saturation region. At this stage, a high voltage signal is applied to pin 2 of WE285 (the music generating integrated circuit 4) via the resistor (R16), thereby initiating operation of the same to provide a musical signal output to the speech network. This indicates that the telephone set is in the hold state. At the same time, a light emitting diode (D12) is forward biased to visually indicate that the telephone set is in the hold state. Since the diodes, (D10) and (D11), are reverse biased, a bias voltage is applied to the transistor (Q5) via the resistors, (R12), (R13) and (R14), to thereby operate the same in the saturation region to cut-off the transistor (Q6). The resistors, (R12), (R13) and (R14), the capacitor (C7), and the transistors, (Q5) and (Q6), cooperatively form a hold function release circuit. When the HOLD function key is pressed again or when the telephone handset is lifted, the potential at node (H) drops, and the current through the resistors, (R12) and (R13), is reduced. The transistor (Q5), which used to operate in the saturation region, is now in the normal operating region. The collector voltage of the transistor (Q5) increases, and the transistor (Q6), which used to operate in the cut-off region, is now in the saturation region. The collector voltage of the transistor (Q6) is thus pulled to near zero potential. Since the collector of the transistor (Q6) is connected to the row status line ROW <3> of the keypad input 10, the resulting effect is similar to connecting the row status line ROW <3> to the column status line COL <5>. The hands-free function output signal (HFO) and the pulse mute signal (P mute) revert to the low logic signal to indicate the release of the telephone set from the telephone hold state.

5. Referring to FIGS. 7 and 9, and to the fifth portion (V) of the timing diagram shown in FIG. 8, when a pulse signal corresponding to the hands-free function input signal (HFI) is generated, the hands-free function output signal (HFO) is a high logic signal. The tone and pulse dialing mute signal (T/P mute) and the pulse mute signal (P mute) are low logic signals. The telephone set is in the hold function state and thus awaits the execution of a dialing action. When the HOLD function key of the keypad input 10 is pressed, the hands-free function output signal (HFO) is maintained as a high logic signal, and the pulse mute signal (P mute) changes to the high logic signal, indicating that the telephone set was released from the hands-free dialing state and is presently in the telephone hold state. Upon generation of another pulse signal corresponding to the hands-free function input signal (HFI), the hands-free function output signal (HFO) remains as a high logic signal, while the pulse mute signal (P mute) reverts to the low logic signal, indicating that the telephone set was released from the telephone hold state and is once more in the hands-free dialing function. Upon generation of still another pulse signal corresponding to the hands-free function input signal (HFI), the hands-free function output signal (HFO) returns to the low logic signal, indicating that the telephone set is released from the hands-free dialing state and is returned to the initial operating state. This illustrates that the telephone speech network interrupt circuit 3 incorporates a change over circuit means so as to permit changing of the state of the telephone set from the hands-free dialing state to the telephone hold state and vice versa by simply operating the HOLD function key.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. A push-button telephone dialing device for a telephone set having a speech network, comprising:
   a telephone handset;
   a handset status signal generating means to generate a handset off hook signal when said telephone handset is in an off hook state;
   a push-button keypad having a plurality of keys which include a hold function key, said keys of said push-button keypad are arranged into N number of rows and M number of columns with N and M being positive integers;
   a telephone dialing integrated circuit means including a key input signal generating means wired to said push-button keypad and producing an appropriate key input signal corresponding to a key pressed on said push-button keypad, said telephone dialing integrated circuit means being activated by said handset off hook signal to receive input signals from said push-button keypad;
   said push-button keypad having N number of row status lines connected to said key input signal generating means, each of said row status lines corresponding to one of said rows, each of aid row status lines having a logic signal to indicate a pressed key condition on the corresponding one of said rows,
   said push-button keypad further having M number of column status lines, each of said column status lines corresponding to one of said columns, first to (M−1)th ones of said column status lines being connected to said key input signal generating means, an Mth one of said column status lines being grounded, each of said first to (M−1)th ones of said column status lines having logic signal to indicate a pressed key condition on the corresponding one of said columns;
   said key input signal generating means comprising a keypad scanning means being activated by said handset off hook signal and including a row scanning means to reflect the respective logic signal of said N number of row status lines as a corresponding N number of row scan signals, a column scanning means to reflect the respective logic signal of said first to (M−1)th ones of said column status lines as a corresponding (M−1) number of column scan signals, and a NAND logic gate means having said first to (M−1)th ones of said column status lines as inputs thereto, said NAND logic gate means generating an Mth column scan signal to indicate a pressed key condition on the corresponding one of said columns of the grounded said Mth one of said column status lines,
   said key input signal generating means producing a hold function key input signal whenever said hold function key is pressed; and
   a speech network interrupting means wired to said speech network and receiving said hold function key input signal from said key input signal generating means to control operation of said speech network.

2. The push-button telephone dialing device as claimed in claim 1, wherein said key input signal generating means further comprises:
   a debouncing circuit means connected to said keypad scanning means and generating a verified proper key input signal when only one of said keys of said push-button keypad is pressed for a duration at least equal to a predetermined debouncing period; and
   a keypad decoding circuit means including a plurality of NOR logic gates, each of said NOR logic gates corresponding to one of said keys of said push-button keypad, each of said NOR logic gates having one of said row scan signals, one of said column scan signals and said verified proper key input signal as inputs thereto;
   whereby, one of said NOR logic gates of said keypad decoding circuit means generates said appropriate key input signal corresponding to a pressed one of said keys of said push-button keypad.

3. The push-button telephone dialing device as claimed in claim 1, wherein said push-button telephone dialing device further comprises a music generating circuit means wired to said speech network and to said speech network interrupting means, said music generating circuit means providing a musical signal output to said speech network when said hold function key is operated to enter a telephone hold state.

4. The push-button telephone dialing device as claimed in claim 3, wherein said telephone set further comprises a hands-free dialing circuit means including a hands-free dialing key operated to enter or to release said telephone set from a hands-free dialing state; said speech network interrupting means including a change over circuit means to change from the hands-free dialing state to the telephone hold state or vice versa when said hold function key is operated.

* * * * *